(12) United States Patent
Perry

(10) Patent No.: US 7,770,601 B2
(45) Date of Patent: Aug. 10, 2010

(54) MAGNETIC VALVE CAP FOR THE VALVE STEM OF A PNEUMATIC TIRE

(76) Inventor: Scott K. Perry, 3548 Happy Valley Road, Victoria, British Columbia (CA) V9C 2Y3

( * ) Notice: Subject to any disclaimer, the term of this patent is extended or adjusted under 35 U.S.C. 154(b) by 359 days.

(21) Appl. No.: 11/682,482

(22) Filed: Mar. 6, 2007

(65) Prior Publication Data

US 2007/0251580 A1 Nov. 1, 2007

(30) Foreign Application Priority Data

May 1, 2006 (CA) .................................... 2545839

(51) Int. Cl.
*F16L 55/10* (2006.01)
(52) U.S. Cl. ..................................... 138/89.3; 137/232
(58) Field of Classification Search ................. 220/230, 220/315, 724; 215/28, 201, 217, 218; 137/382, 137/232, 233, 231, 381, 377, 383; 138/89.1, 138/89.4, 89.3; 152/428, 429

See application file for complete search history.

(56) References Cited

U.S. PATENT DOCUMENTS

| | | | | | |
|---|---|---|---|---|---|
| 1,253,573 | A | * | 1/1918 | Burke et. al. | 138/89.4 |
| 1,473,032 | A | * | 11/1923 | Freedlander | 138/89.1 |
| 1,488,906 | A | * | 4/1924 | Bowden | 138/89.1 |
| 2,438,231 | A | * | 3/1948 | Schultz et al. | 401/244 |
| 2,453,001 | A | * | 11/1948 | De Stefano | 138/89.1 |
| 6,190,573 | B1 | * | 2/2001 | Ito | 252/62.55 |
| 6,382,450 | B1 | * | 5/2002 | De Rosa et al. | 220/230 |

* cited by examiner

*Primary Examiner*—John Rivell
*Assistant Examiner*—Macade Brown
(74) *Attorney, Agent, or Firm*—Gordon Thomson

(57) ABSTRACT

A magnetic dust cap for a pneumatic tire comprising an external valve stem having a threaded top portion having a width, a length, a top end and a bottom end and a rubberized bottom portion having a width and a top end. The magnetic dust cap comprises a body for capping the external valve stem and magnetic means disposed within the body to removably adhere to a washer. The washer is adapted for threaded engagement over the threaded top portion of the valve stem.

16 Claims, 21 Drawing Sheets

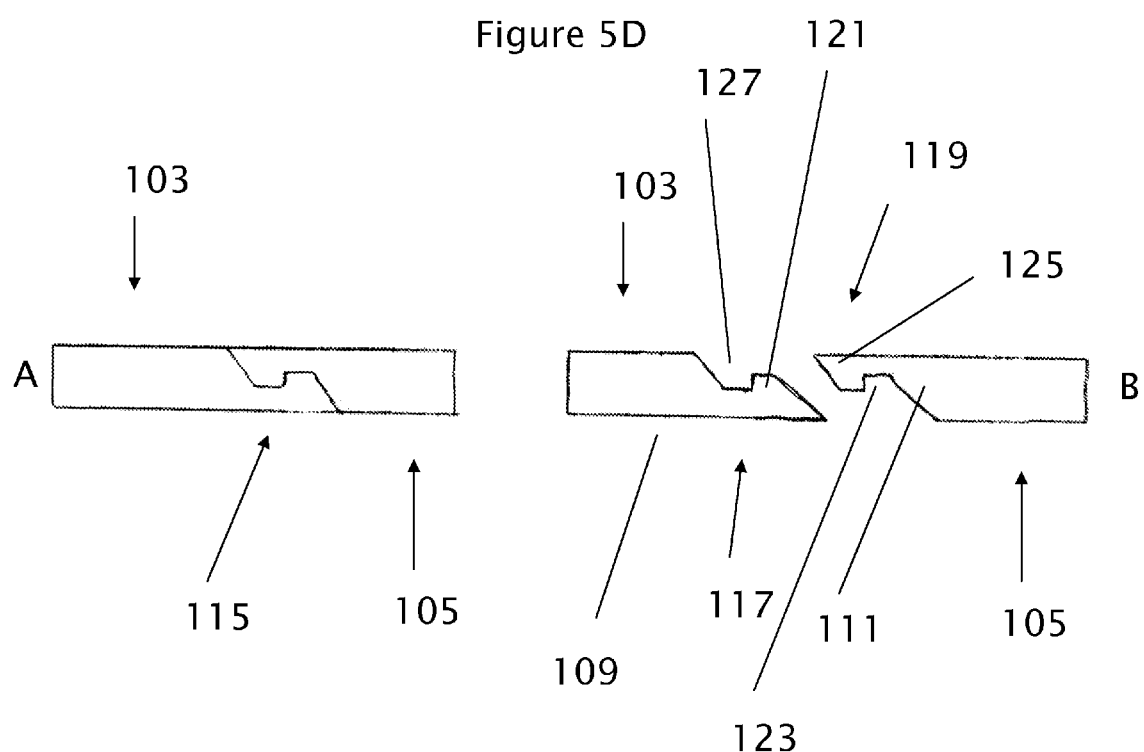

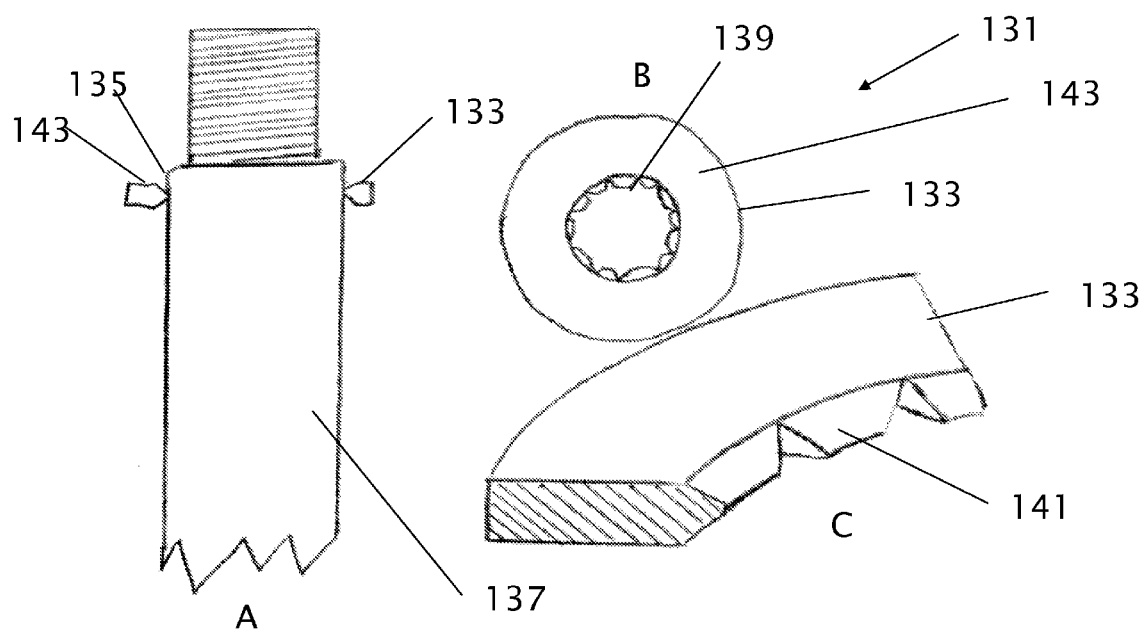

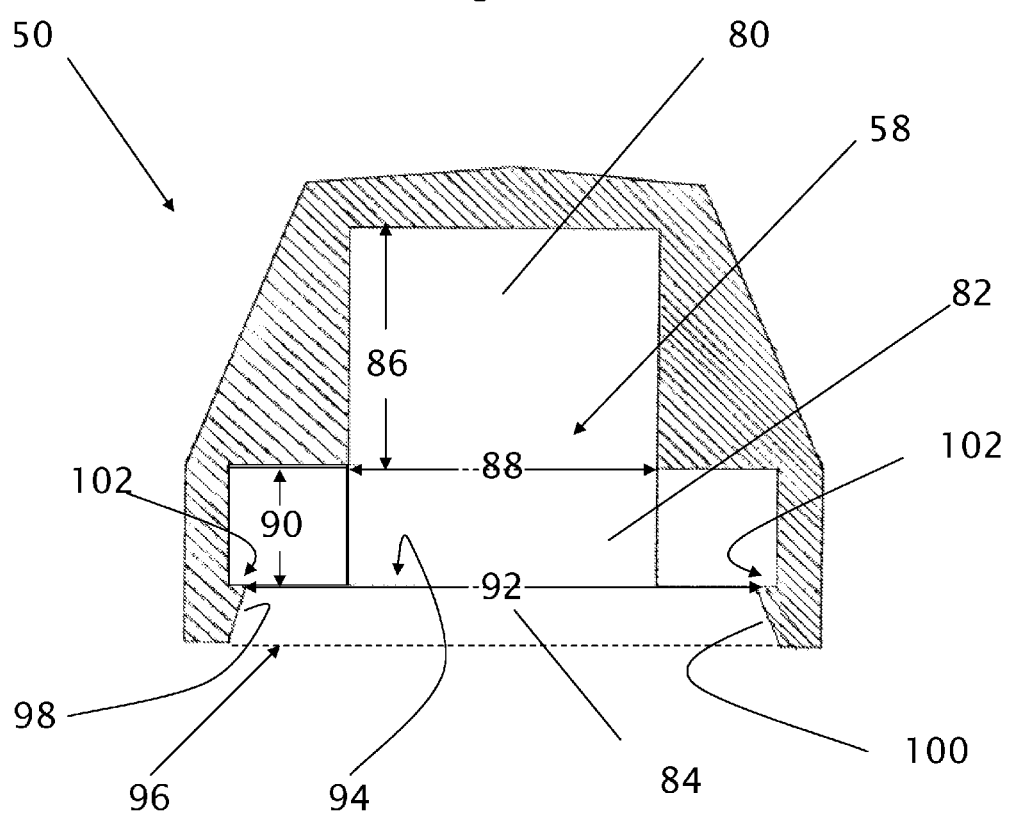

MAGNETIC VALVE CAP FOR THE VALVE STEM OF A PNEUMATIC TIRE

CROSS-REFERENCE TO RELATED APPLICATIONS

This application claims foreign priority from and the benefit of Canadian Patent Application #2,545,839 "Magnetic Dust Cap" filed in the Canadian Patent Office on May 1, 2006.

BACKGROUND

1. Field of the Invention

The present invention relates to the field of resilient tire and wheels and more particularly to dust caps for inflating valves and stems and specifically for a magnetic valve cap for the valve stem of a pneumatic tire.

2. Description of the Prior Art

The prior art indicates that since the early 1920's there has been a great effort in designing the ultimate dust cap for standard valves and tires and the like. One common and popular design is the twist-on plastic dust cap. The problem and frustration for most users of this product is that they are not easily removed or put back on. They are easily fumbled, dropped or misplaced while accessing the tire valve. Prior art valve caps are illustrated in FIG. 1 and FIG. 2 herein and labeled "Prior Art". There have been other designs of valve caps that involve either a tether or hinge that allows the valve cap to remain attached to the valve assembly. These designs are prone to failure and are cumbersome to use. As well, valve stems are often located in difficult to access areas within a wheel rim making the turning motion to remove or replace them difficult.

Therefore, there is a continuing need for a dust cap that is easy to use placing on and off the valve stem.

SUMMARY OF THE INVENTION

In accordance with the present invention a magnetic dust cap comprises a body, magnetic means, a possible spacer washer and a threaded washer. The washer is mounted over the valve stem threaded portion to provide a magnetically adherent contact surface for the magnetic means. Magnetic means is placed within the body of the cap so that when the cap is placed over the stem, the magnetic means adheres to the washer and maintains the cap in place. The body completely covers the valve stem threaded portion to provide a seal against moisture and dirt. The present invention allows for quick and trouble free attachment and removal of the cap because there is no twisting motion required on the cap. The cap, once removed, can be adhered to an adjacent metallic surface for easy location and retrieval. Once on the stem, the magnetic valve cap seals the valve stem and prevents moisture and dirt from entering the valve stem.

OBJECTS AND ADVANTAGES

One object of my invention is to overcome the deficiencies of the prior art.

Another object of my invention is to provide a dust cap that magnetically adheres to a valve stem without twisting motion.

Another object of my invention is to provide a kit comprising a dust cap that magnetically adheres to a valve stem and (one or more) washer(s) (threaded and possible unthreaded spacer washer) for placement on the valve stem so that present valve stems can be retrofitted.

Still another object of my invention is to provide an easily manufactured, inexpensive solution to the problems noted above.

Another object of the invention is to provide a dust cap that is able to magnetically adhere to an adjacent metallic part while not on valve stem so it can be easily found and retrieved.

Still further objects and advantages of my invention will become apparent from a consideration of the ensuing description and drawings.

DESCRIPTION OF THE FIGURES

FIG. 5D illustrates the locking means of the ring clamp of FIG. 5C.

FIG. 5E illustrates still another embodiment of my invention using a push on ring washer.

FIG. 6 illustrates a dust cap body of one embodiment of the invention in cross-section.

DETAILED DESCRIPTION OF THE INVENTION

Prior Art

Figure 1:
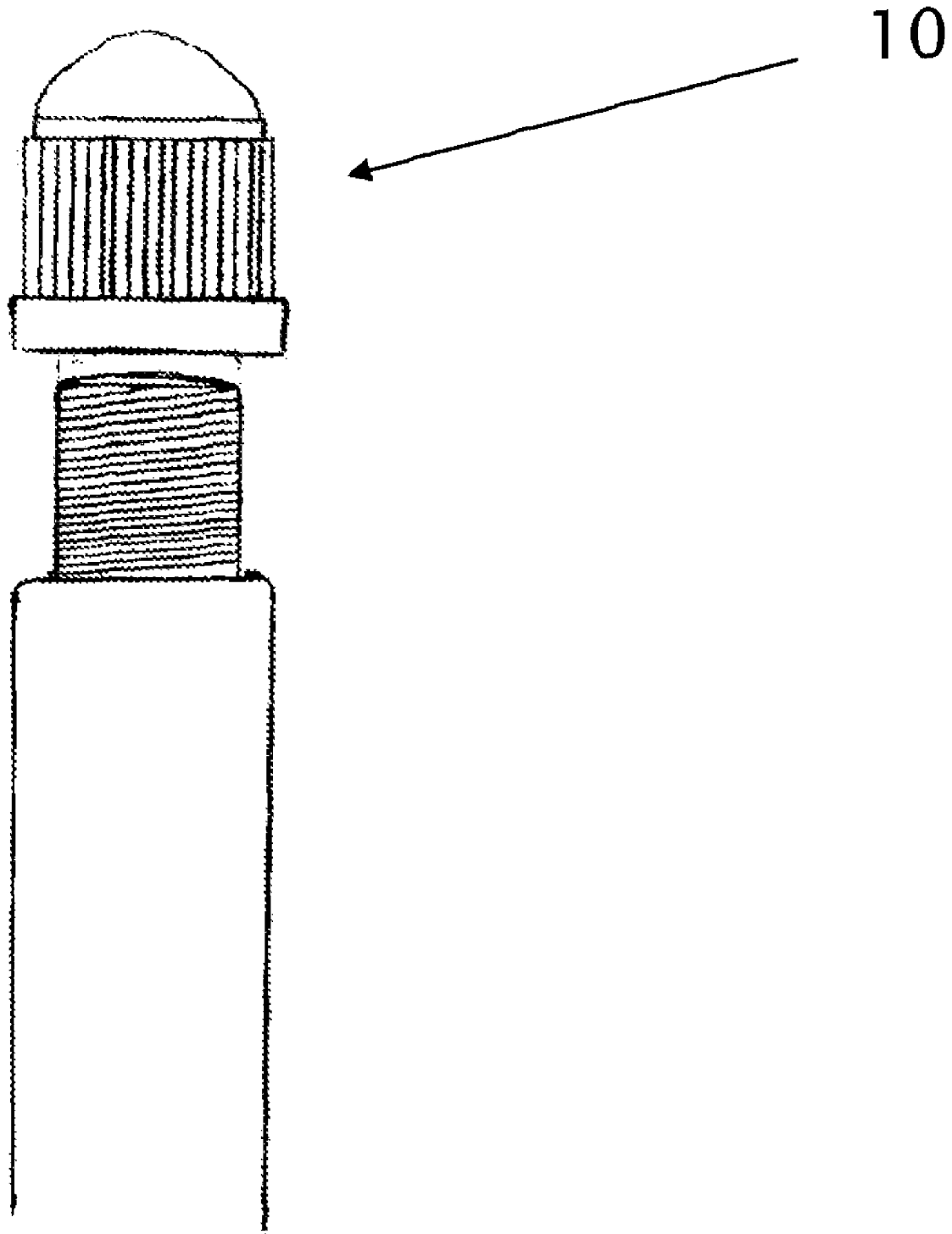
FIG. 1 illustrates a prior art dust cap on a valve stem.
Figure 2:
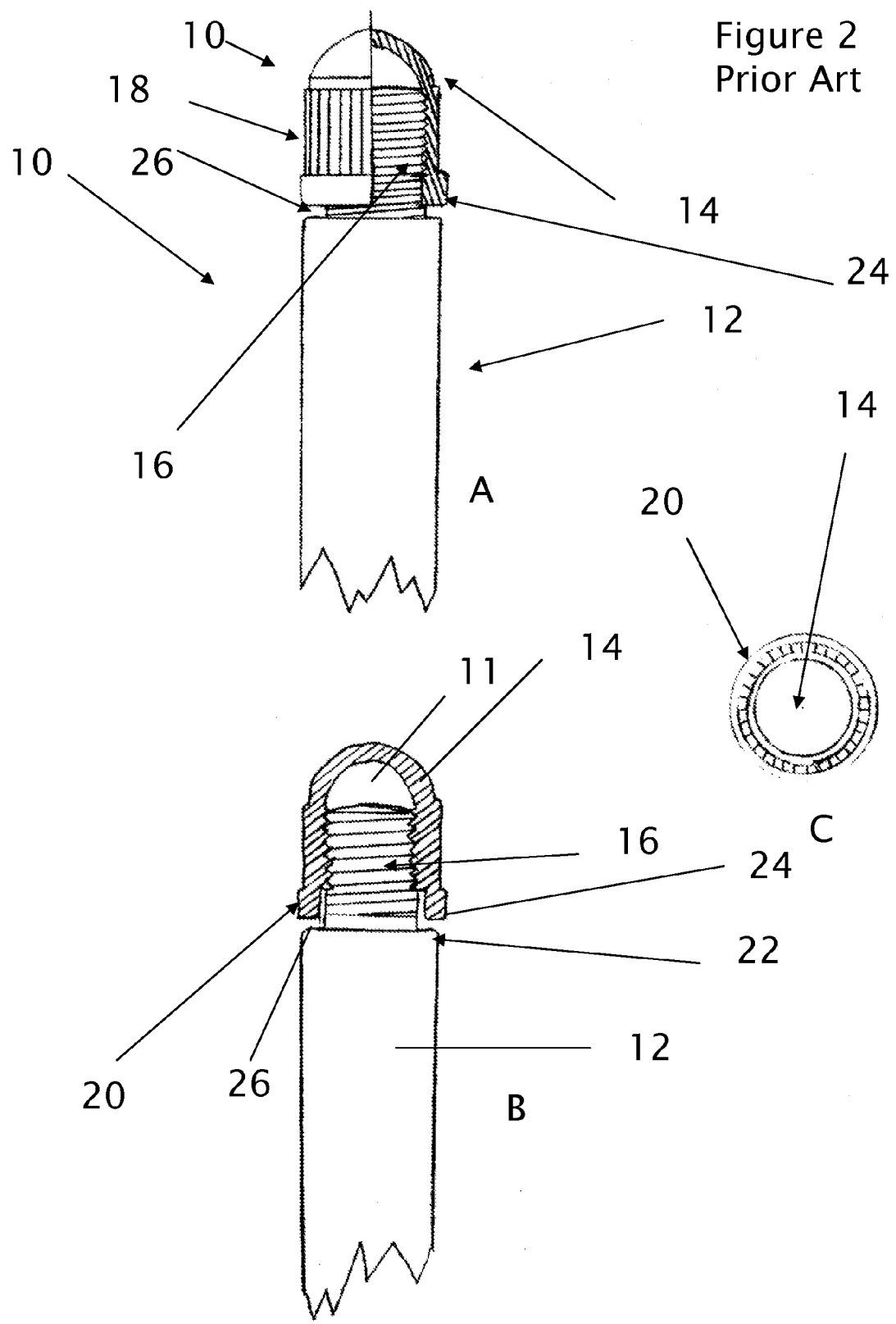
FIG. 2 illustrates other views of a prior art dust cap on a valve stem.

The most commonly available dust cap is the tried and true twist-on plastic cap illustrated in FIGS. 1 and 2 as item (10). This type of cap is cumbersome to work with and tends to fall off the stem when twisted off and onto the ground. The result is that dirt and debris adhere to the cap and once the cap is replaced onto the valve stem, the stem can become dirty and clogged. Alternatively, the cap is lost and the average person does not bother to replace the cap. The result is that the valve is subject to the environment and prone to clogging and damage.

FIG. 2 illustrates other shortcomings of the typical prior art valve cap. FIG. 2A and FIG. 2B show a typical cap (10) in quarter-section and cross-section respectively mounted in a threaded engagement onto the threaded portion (16) of a pneumatic tire valve stem (12). The outside surface of the cap (10) includes a ferruled portion (18) for gripping during the twist-off and twist-on operations. The cap includes a domed portion (14) which leaves a volume (11) above the valve stem (12) where dirt and debris can accumulate. Furthermore, the valve cover includes a skirt (20) at the bottom thereof which is intended to protect against ingress of water and dirt when the valve is fastened onto the valve stem threaded portion. However, in many such installations, there may be a gap (26) between the bottom surface of the cap (24) and the top portion of the valve stem rubber portion (22). This permits the ingress of dirt and water because the seal is not complete. FIG. 2C shows the prior art cap (10) in a bottom view.

My Invention

Figure 3:
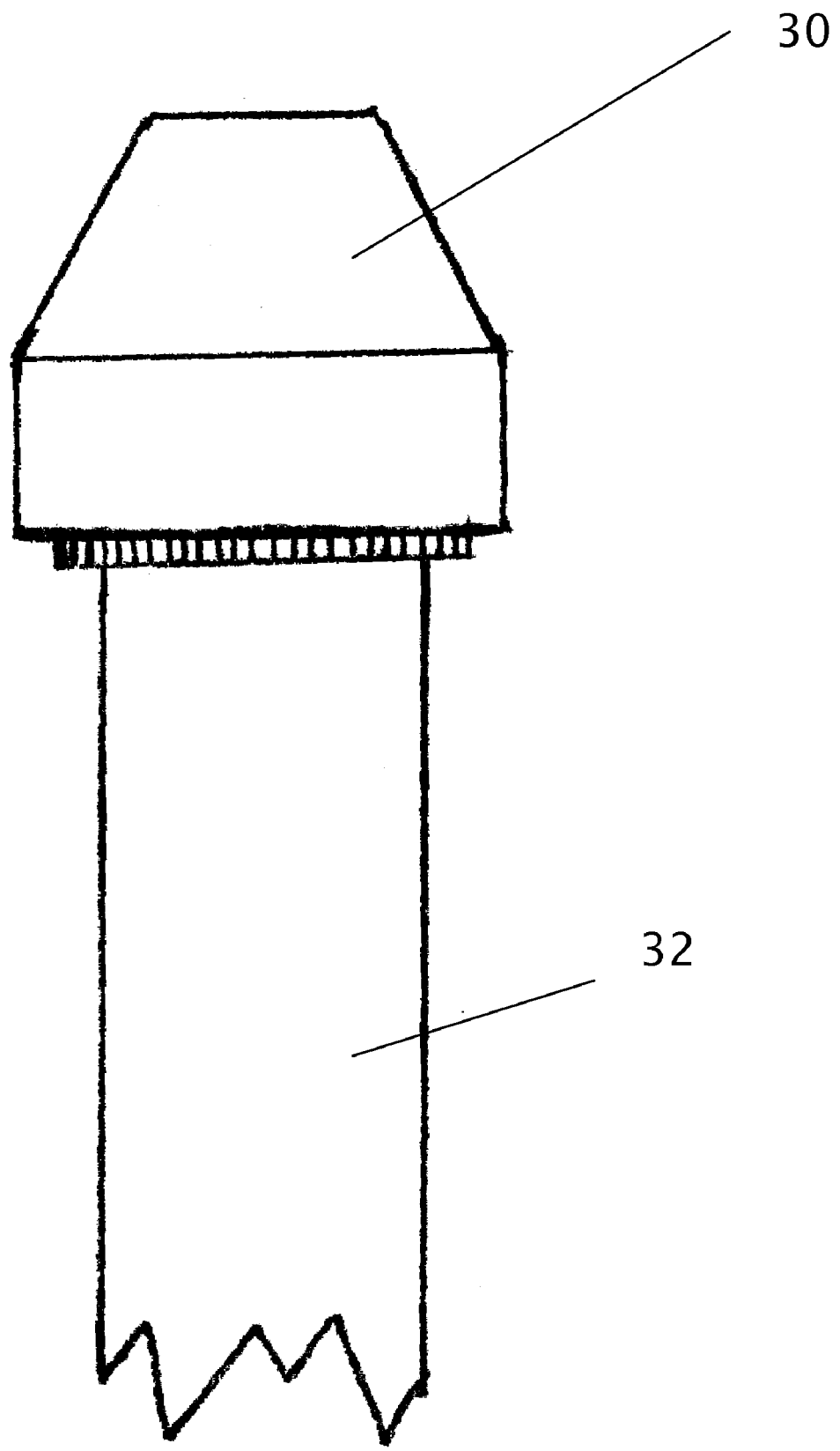
FIG. 3 illustrates one embodiment of my invention on a valve stem.
Figure 4:
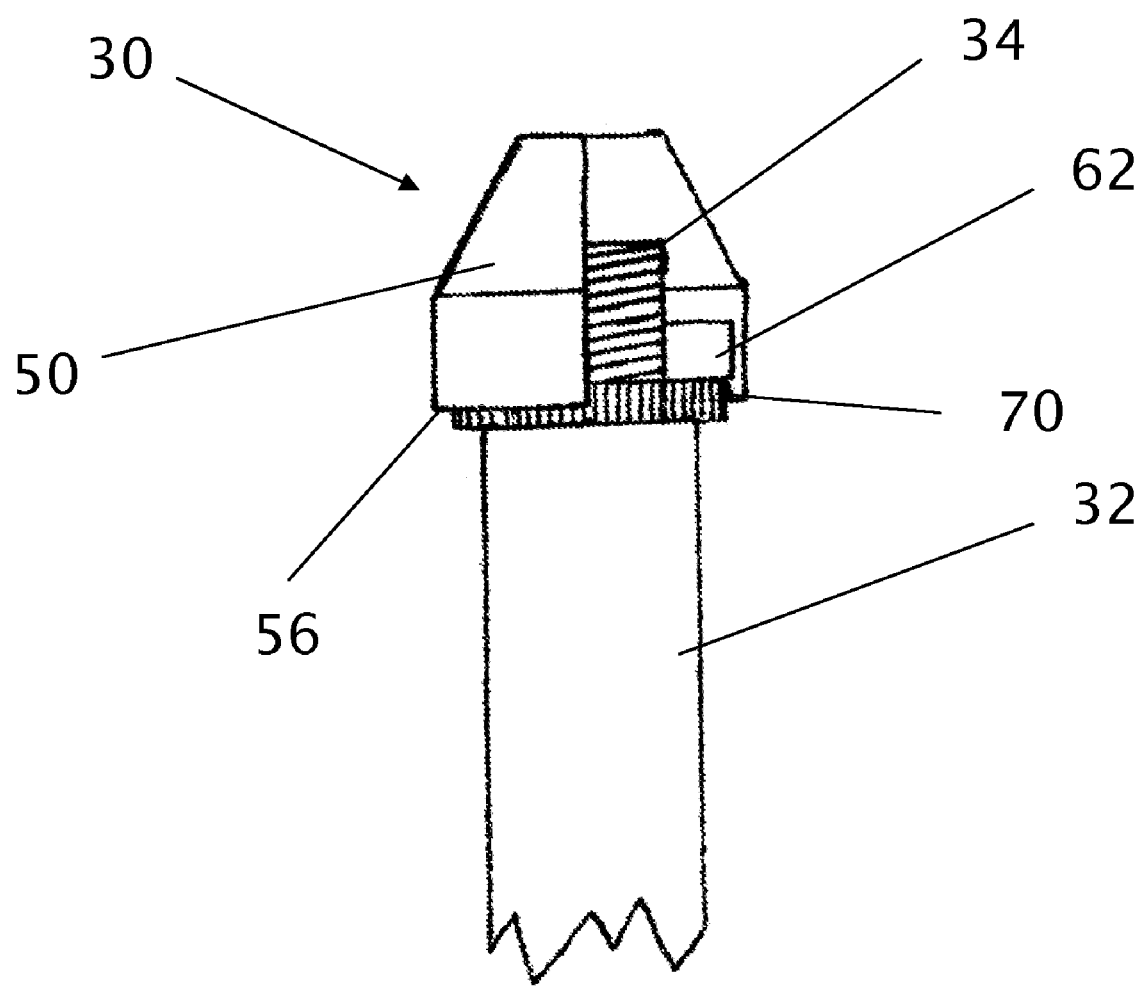
FIG. 4 illustrates another embodiment of my invention with the dust cap shown in quarter-section.

Referring to FIG. 3 and FIG. 4, there is shown one embodiment of my invention that overcomes these deficiencies by providing a new and inventive magnetic valve cap (30) for a pneumatic tire comprising an external valve stem (32) having a threaded top portion (34) which is located under the cap (30).

Figure 5:
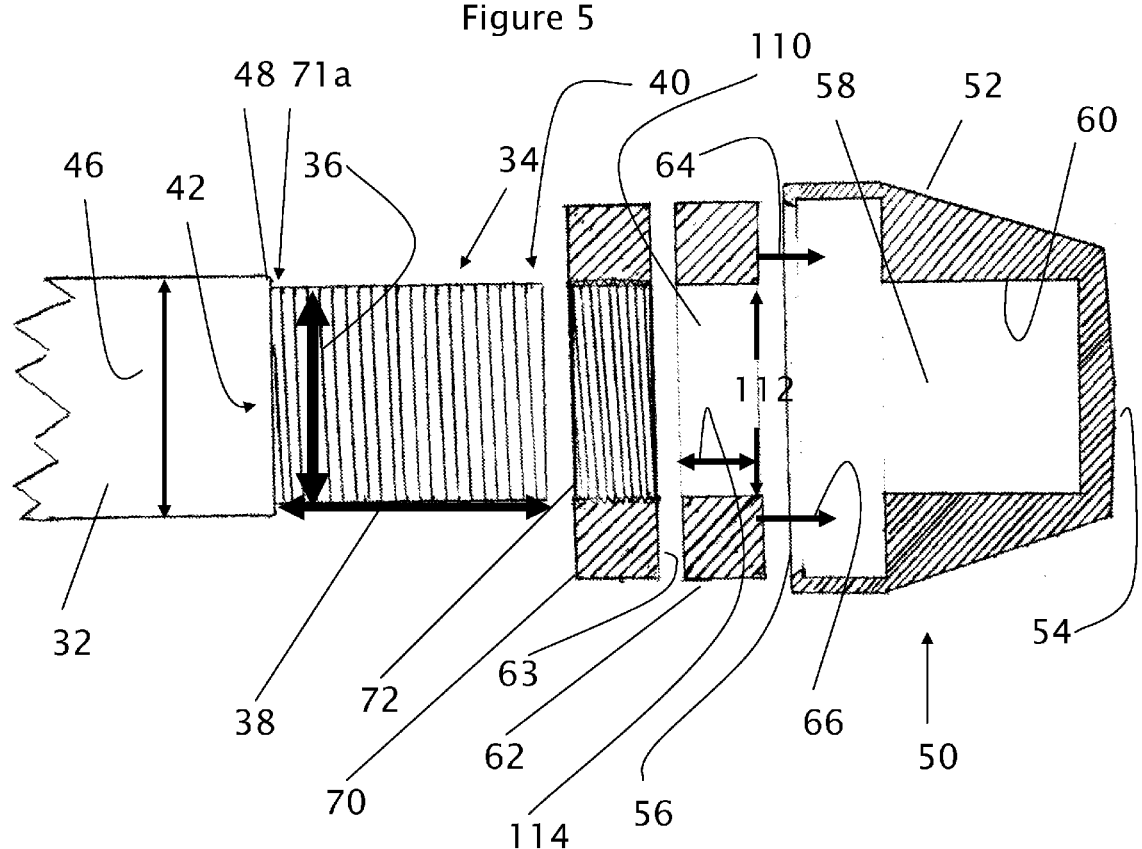
FIG. 5 illustrates yet another embodiment of my invention with the dust cap, magnet and washer shown in assembly view and in cross-section.

Referring to FIG. 5, the valve stem top portion (34) is threaded and has a width (36), a length (38), a top end (40) and a bottom end (42). The valve stem has a rubberized bottom portion (32) also having a width (46) and a top end (48). In other embodiments of the tire valve stem, the bottom portion (32) may be metallic without a rubber coating. Utilizing my invention with this type of metallic valve stem is described below.

Still referring to FIGS. 4 and 5, my invention, the magnetic valve cap (30) comprises a body (50) for capping the valve stem threaded portion (34). The body (50) comprises an outer surface (52), a closed top surface (54), an open bottom end (56), an internal volume (58) and an inside surface (60). My magnetic valve cap further comprises magnetic means (62) disposed within the body (50) as illustrated by arrows (64) and (66) and further explained below. The magnetic means (62) is adapted to removably adhere to a washer (70) having threads (72) and adapted for threaded engagement over the threaded top portion (34) of the valve stem. The washer is installed onto the threaded portion of the valve stem so that the washer has a final operating position abutting the top end (48) of the rubberized bottom portion (32) of the valve stem where it meets the bottom end (71a) of the threaded top portion of the valve stem as shown in this embodiment.

Figure 5A:
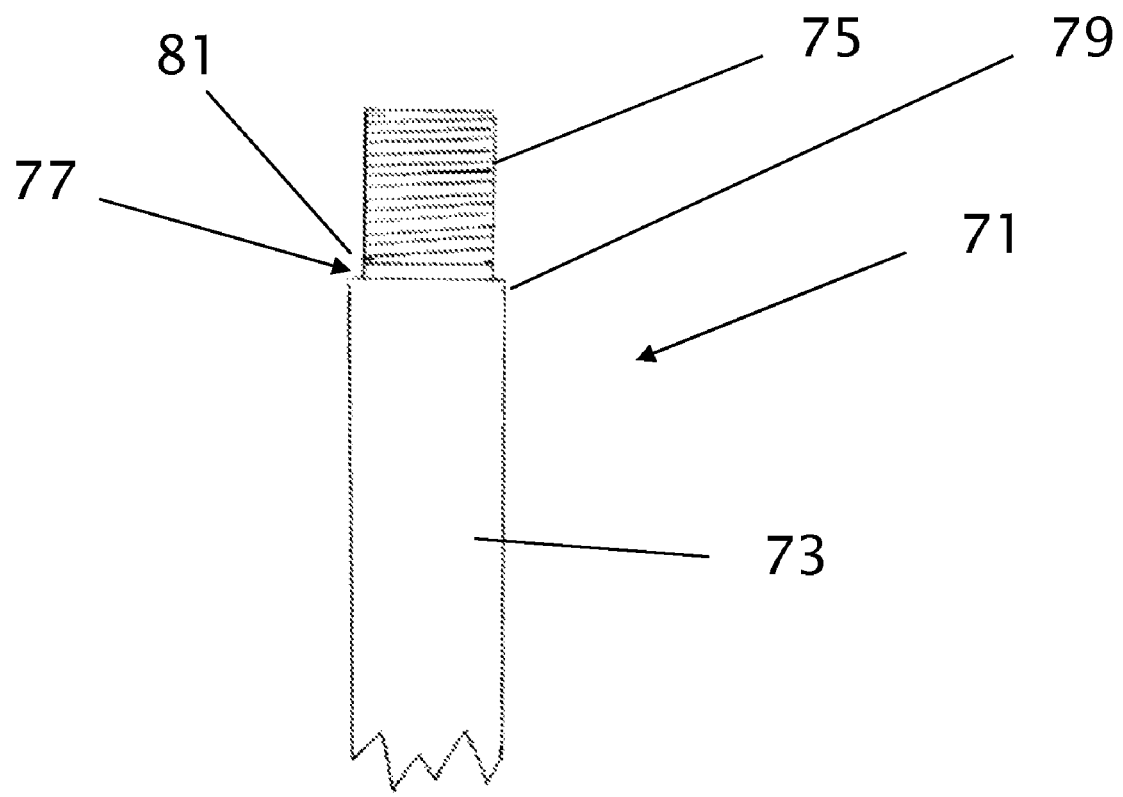
FIG. 5A illustrates a tire valve stem not having a rubber bottom portion.

Referring to FIG. 5A there is shown an embodiment of a tire valve stem (71) that does not have rubber coating on the lower portion (73). The lower stem portion (73) is metallic as is the upper threaded portion (75). A gap (77) is present between the upper end (79) of the lower stem portion and the bottom end (81) of the threaded portion (75).

Figure 5B:
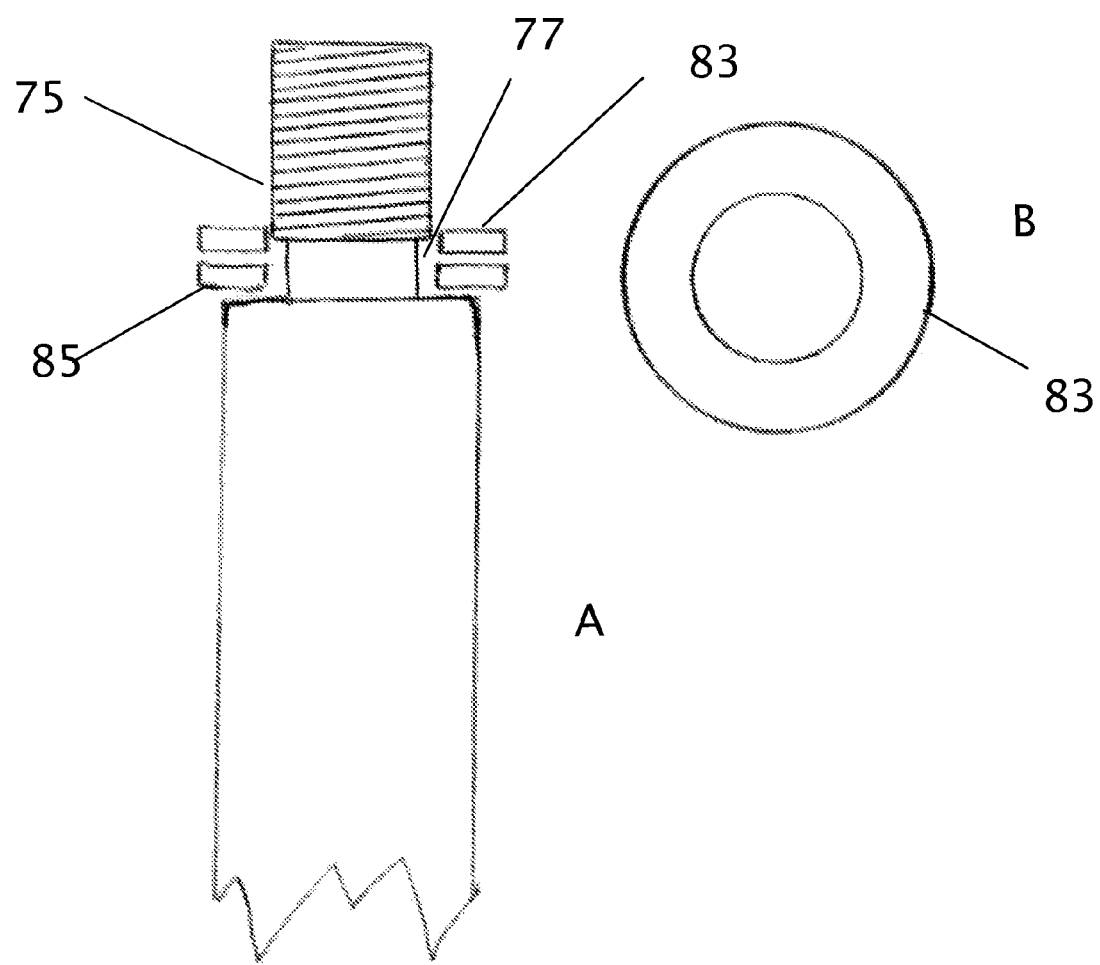
FIG. 5B illustrates another embodiment of my invention using spacer washers.

Referring to FIG. 5B, views A and B, my invention addresses this embodiment of a tire valve stem by providing at least one washer (83) that is disposed at the end of the threaded portion (75) such that it falls within the gap. If the gap cannot be tightly filled with a single washer (83) then another washer (85) can also be threaded onto the valve stem threaded portion so that it tightens against the first washer (83). Additional washers may be added as required to fill the gap and ensure that there is a metallic sealing contact surface area for the magnetic means within the dust cap. In still another embodiment of the invention the spacer washers can also be used to ensure that there is no gap between the washer and the top end of the rubberized portion of a valve stem.

Referring to FIG. 5, in another embodiment of the invention the body (50) is non-metallic. In yet another embodiment of the invention the body (50) is metallic. In still another embodiment of the invention the body (50) is non-ferrous.

Figure 5C:
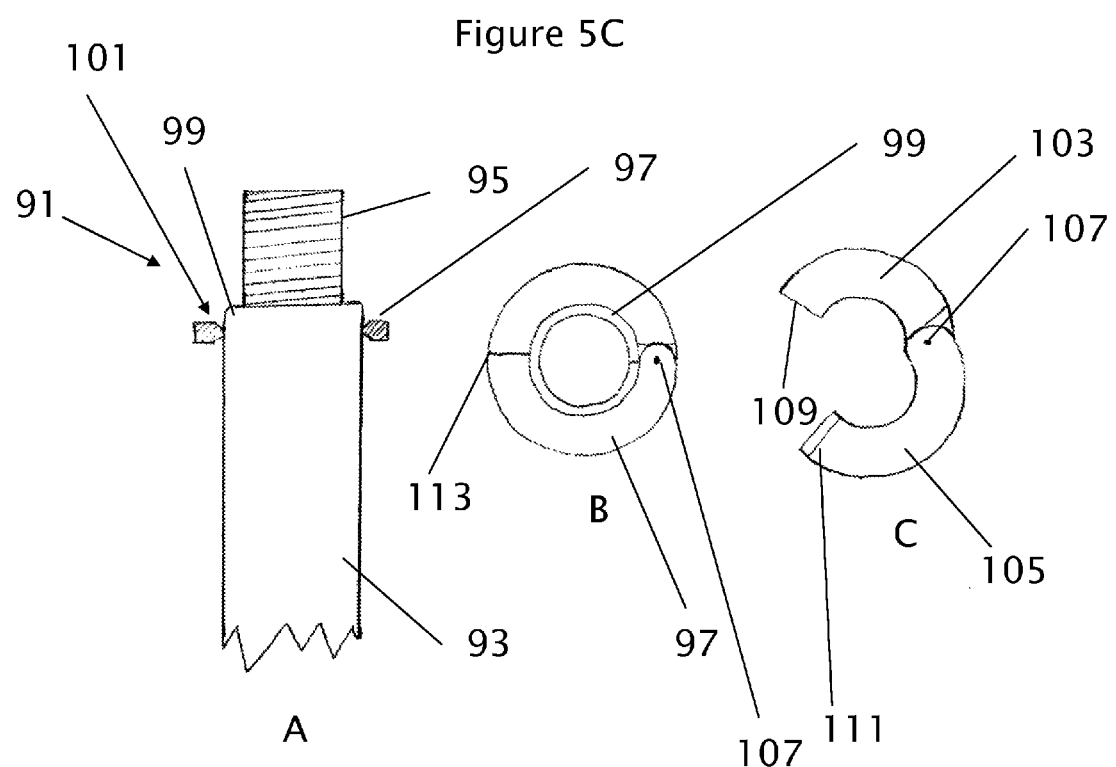
FIG. 5C illustrates yet another embodiment of my invention using a ring clamp.

Referring to FIG. 5C, views A, B and C, there is shown a valve stem (91) having a rubber bottom portion (93) and a threaded top portion (95). In another embodiment of my invention there is a ring clamp (97) adapted to seat around the top end (99) of the rubber bottom portion (93) in a compressing relationship thereby providing a metallic contact surface (101) for the magnetic means within the dust cap. The ring clap (97) comprises a first jaw (103) and a second jaw (105) hinged in a pivoting relationship at hinge (107). The free ends (109) and (111) of the respective first and second jaws lock together at (113) by locking means (115) shown in FIG. 5D.

Referring to FIGS. 5C and 5D, views A and B, locking means (115) comprises a first key and keyway set (117) disposed on the free end (109) of jaw (103) and a second inverted key and keyway set (119) disposed on the free end (111) of jaw (105). The pivot (107) and the jaws themselves are provided with a limited amount of resiliency so that the keyway sets are permitted to overlap each other as shown in view A FIG. 5D. In order to lock the ring clamp into position on the top end of the rubber portion of the tire stem, the first and second jaws are pivoting towards each other so that first key (121) is inserted into second keyway (123) and second key (125) is inserted into first keyway (127) as shown in FIG. 5D view A. Once the jaws are joined, the locking means (115) provides for secure attachment of the ring clamp onto the top end of the rubber portion of the valve stem so that it does not come off even when the car tire is experiencing high revolutions at highways speeds.

Referring to FIG. 5E, views A, B and C, there is shown yet another embodiment of my invention (131) wherein the ring washer (133) is adapted for a press fit over the top end (135) of the rubber portion of the valve stem (137). In this embodiment, the inside diameter (139) of the ring washer comprises a serial plurality of elongated teeth (141) extending there from. The teeth (141) have some resiliency which permits the teeth to flex upwards when the ring is pushed onto the top of the rubber portion of the valve stem. Once pushed onto the rubber portion of the valve stem the teeth tend to cut into the rubber and lodge themselves in a secure relationship into the rubber so that they cannot be dislodged when upwards forces are applied to the ring. In this way a secure platform (143) is provided to which magnetic means in the dust cap can adhere to.

Referring to FIG. 5 and FIG. 6, the internal void (58) comprises a top cylindrical portion (80) as shown in this embodiment. In other embodiments this portion may be shaped differently depending upon the type of injection mould process used to make it. It also includes a middle disc-shaped portion (82) and a bottom wafer-shaped portion (84). The top cylindrical portion (80) of the void comprises a generally rectangular cross-section having a height (86) and a width (88) substantially equal. The void top cylindrical portion (80) is adapted to accommodate the entire length and width of the threaded top portion of the valve stem so that when the cap is placed over the valve stem the bottom surface of the cap (56) rests below the top surface (63) of the threaded washer (70) in its installed position on the threaded portion of the valve stem. The bottom of the cap forms a tight compressive seal around the diameter of the washer and prevents moisture and dirt from getting into the void of the cap body. The middle disc-shaped portion (82) of the void has a rectangular cross-section, a height (90) and a width (92) that is substantially longer than its height. The bottom wafer portion (84) is shaped like a thin truncated cone having a top surface (94) and a bottom surface (96) and a first (98) and second (100) inwardly inclined sides. The top surface is shorter than the bottom surface and the bottom surface (96) of the bottom wafer portion (84) has the same length (92) as the bottom surface of the middle disc-shaped portion (82) of the void so that a lip (102) is formed around the perimeter of the lower surface of the disc-shaped portion.

Figure 6A:
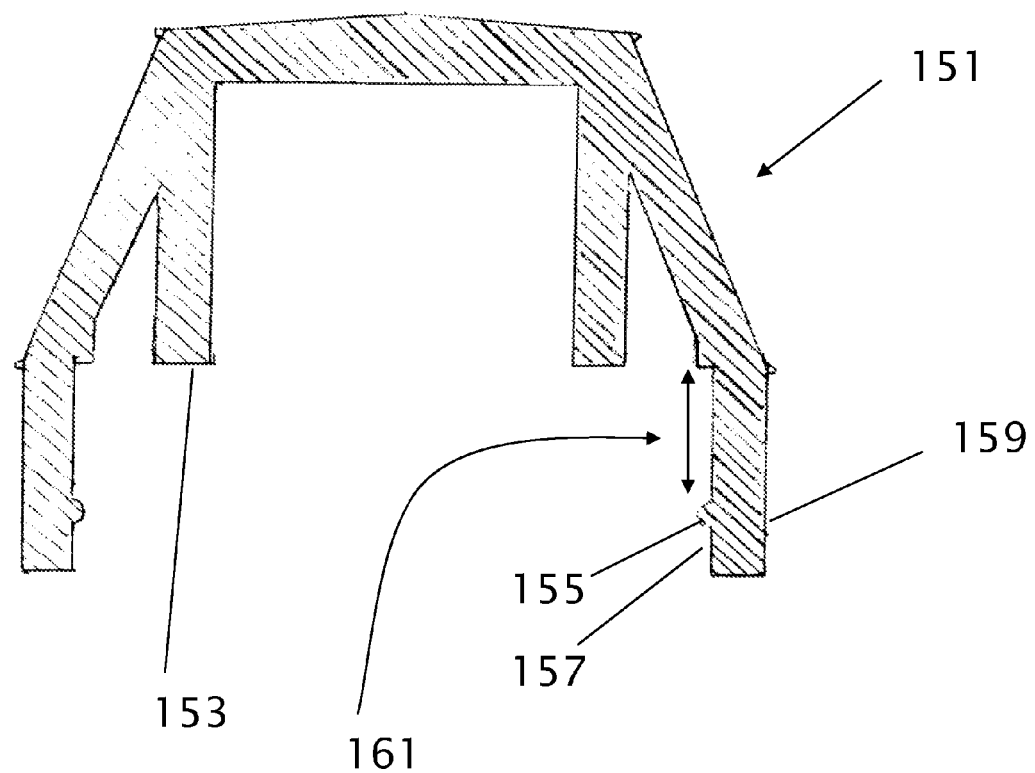
FIG. 6A illustrates a dust cap body of another embodiment of my invention in cross-section.

Referring now to FIG. 6A there is shown an alternate embodiment to the cap body (151) of my invention. The cap body of this embodiment includes a circular skirt (153) adapted for insertion into the valve stem once the cap is screwed onto the threaded portion of the valve stem. The skirt seals the valve against the ingress of dirt and moisture. As well, this embodiment includes a semi-circular protuberance (155) around the inside surface (157) of the lower wall (159) of the cap body (151). The protuberance is adapted to hold magnetic means in place within the annular space defined by the arrow (161). This embodiment tends to be easier to mold than the embodiment shown in FIG. 6 which uses a sharp edge (102) to maintain magnetic means in place.

Figure 7:
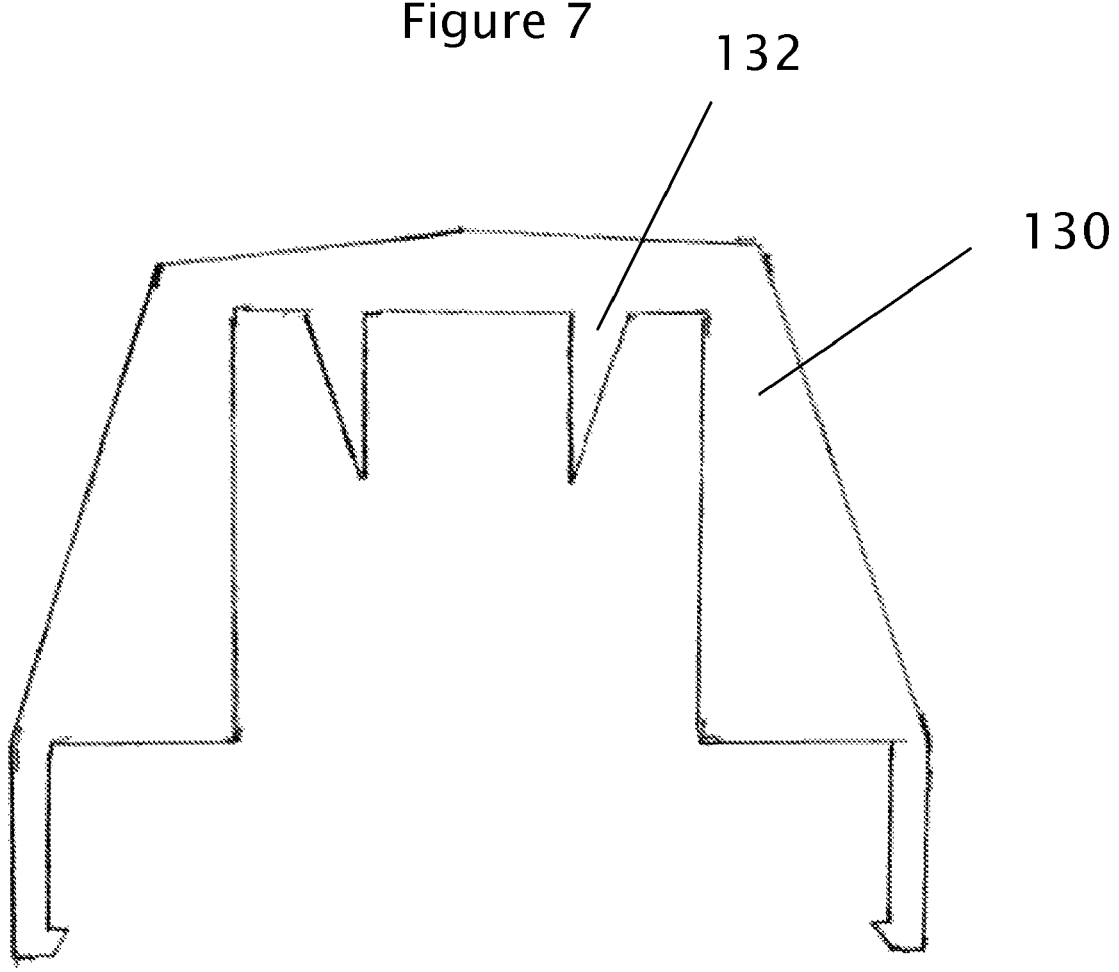
FIG. 7 illustrates a dust cap body of yet another embodiment of my invention.

Referring to FIG. 7, there is shown another embodiment of the valve cap body (130) wherein a circular dependent flange (132) is adapted to enter the threaded portion of valve stem and further seal the valve stem against the ingress of water and dirt when the valve cap is placed over the threaded portion of the valve stem.

Referring back to FIG. 5, the magnet means (62) comprises a permanent magnet. In one preferred embodiment of the invention the permanent magnet comprises a rare earth magnet. In another preferred embodiment of the invention the permanent magnet is a rare earth magnet made from neodymium-iron-boron (NdFeB). In yet another preferred embodiment of the invention the rare earth magnet is made from samarium-cobalt (SmCo). In a preferred embodiment of the invention the rare earth magnet has a magnetic strength to properly seal the cap to the washer without dislodging during rotation of the car tire. In one preferred embodiment of my invention the magnet has a grade of N35 as it is the most cost-effective magnet to use in this application at this time. The rare earth magnetic (62) is shaped in the form of a ring having an annulus (110) having a diameter (112) permitting passage of the top portion of the valve stem without frictional contact. The magnet has a thickness (114) equal to the height (90) of the middle disc-shaped portion of the void (82) as shown in FIG. 6 so it may be fitted entirely within the middle disc-shaped portion of the void. Once the rare earth magnet is inserted into the disc-shaped portion of the void the lip (102) as shown in FIG. 6 acts to support the bottom surface of the magnetic and retain it within the disc-shaped portion of the void. The same function is accomplished by the protuberance (155) in the embodiment of the cap body shown in FIG. 6A. In another embodiment of the invention the magnet is adhesively secured within the disc-shaped portion of the void.

Still referring to FIG. 5 and FIG. 6 the washer (70) is adapted for threaded engagement with the top portion of the valve stem (34) so that the washer may be placed on the top portion of the valve stem and threaded down the valve stem until it is in permanent and compressive contact with the top (48) of the rubber portion (32) as shown in this embodiment of the valve stem. When the cap is placed over the valve stem as shown in FIG. 3, the rare earth magnet comes into contact with the top surface of the washer and adheres magnetically thereto thereby maintaining the cap body in a secure and removably fixed position. When the cap is removed from the valve stem, the rare earth magnetic will removably fix the cap to an adjacent metallic body, such as a vehicle fender, bicycle frame whichever applicable device the cap is being used for, thereby preventing loss of the cap.

Figure 8:
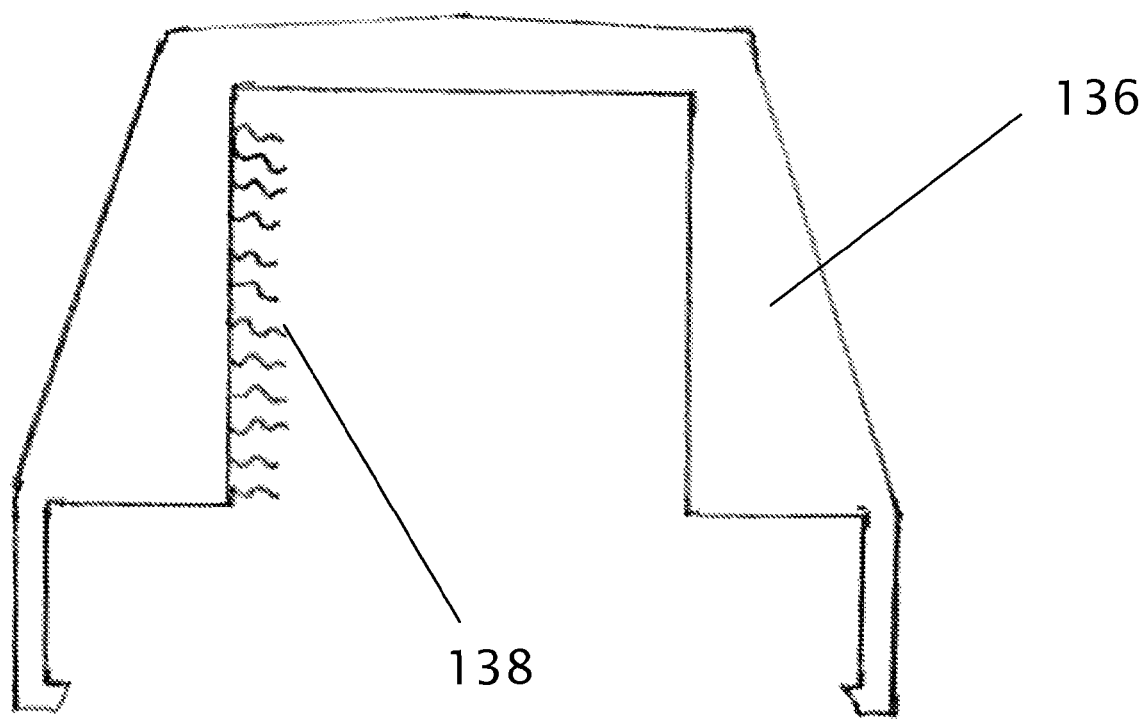
FIG. 8 illustrates a dust cap body of another embodiment of my invention.

Referring to FIG. 8, there is shown another embodiment of the valve cap body (136) incorporation cilia (138) or brushes within the inside wall of the void in order to provide additional sealing against the ingress of water and dirt once the valve cap is installed over the threaded valve stem.

Figure 9:
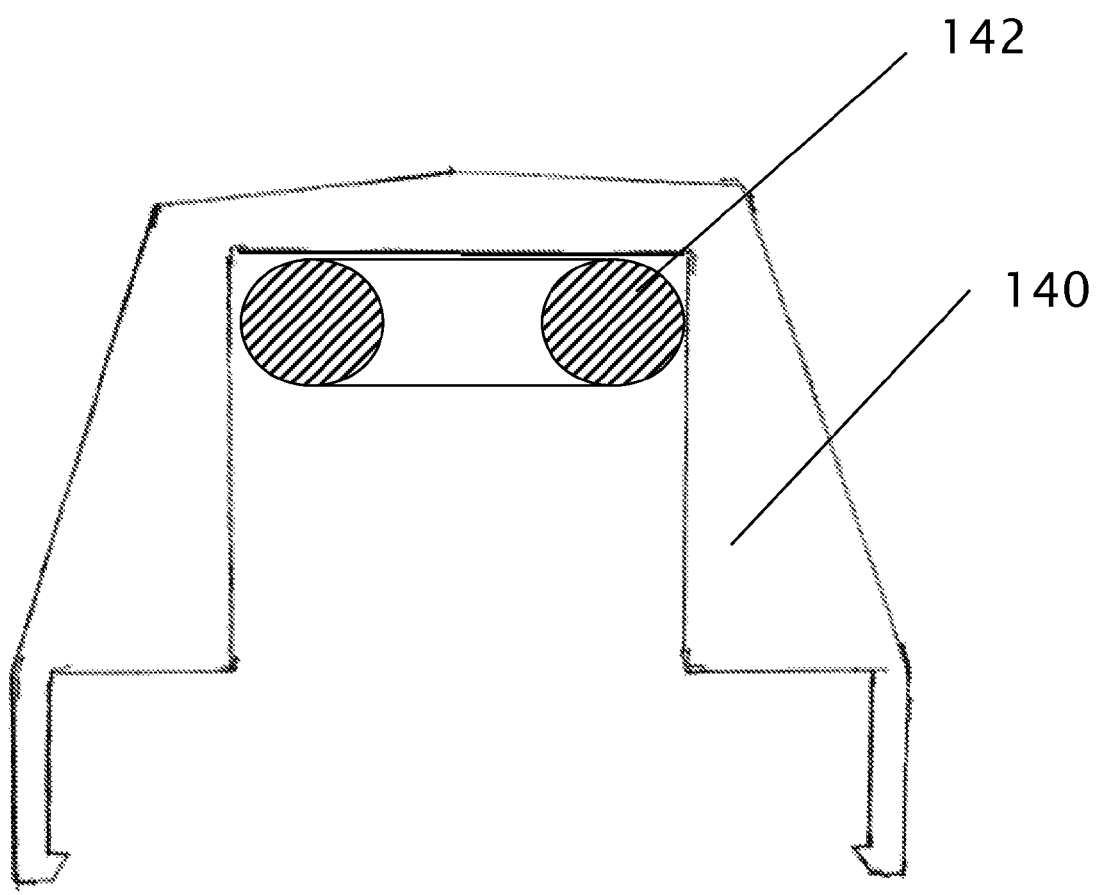
FIG. 9 illustrates a dust cap body of still another embodiment of my invention.

Referring to FIG. 9, there is shown another embodiment of the cap body (140) wherein a rubber o-ring (142) is incorporated within the top cylindrical portion of the void to provide for sealing of the valve once the cap is placed on the valve stem.

Figure 10:
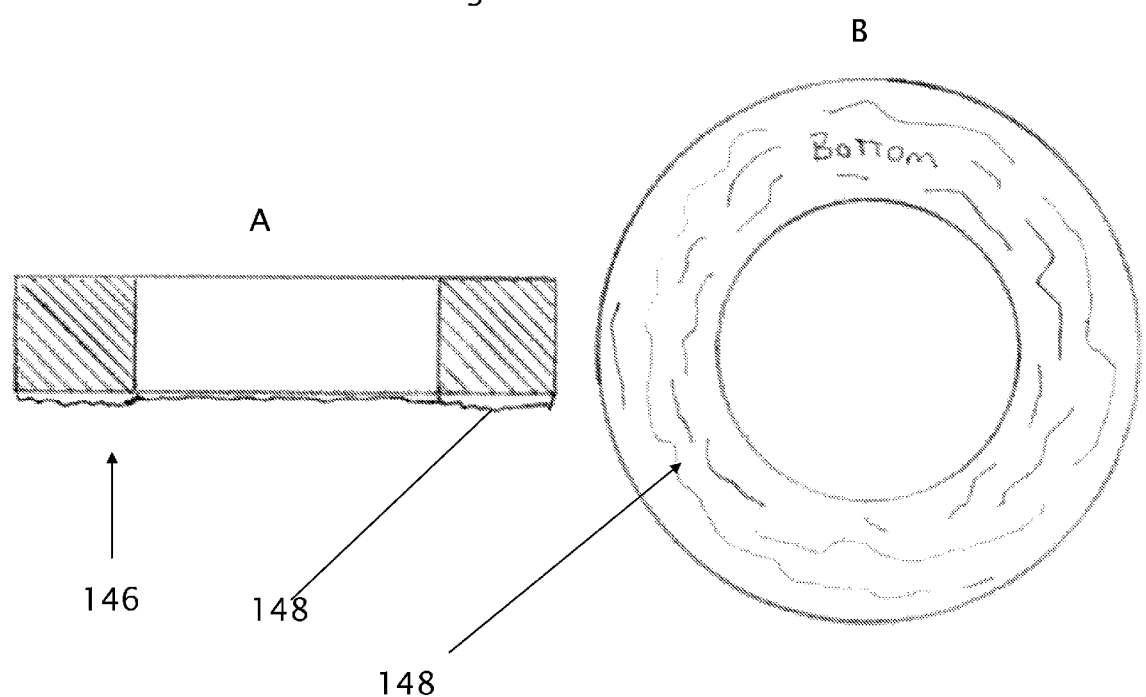
FIG. 10 illustrates sealing means of one embodiment of my invention.

Referring to FIG. 10, views A and B, there is shown another embodiment of my invention wherein the bottom surface of the ring magnet (146) is coated with a gelatinous sealing substance (148) such as silicon in order to further seal the valve stem against water and dirt.

Figure 11:
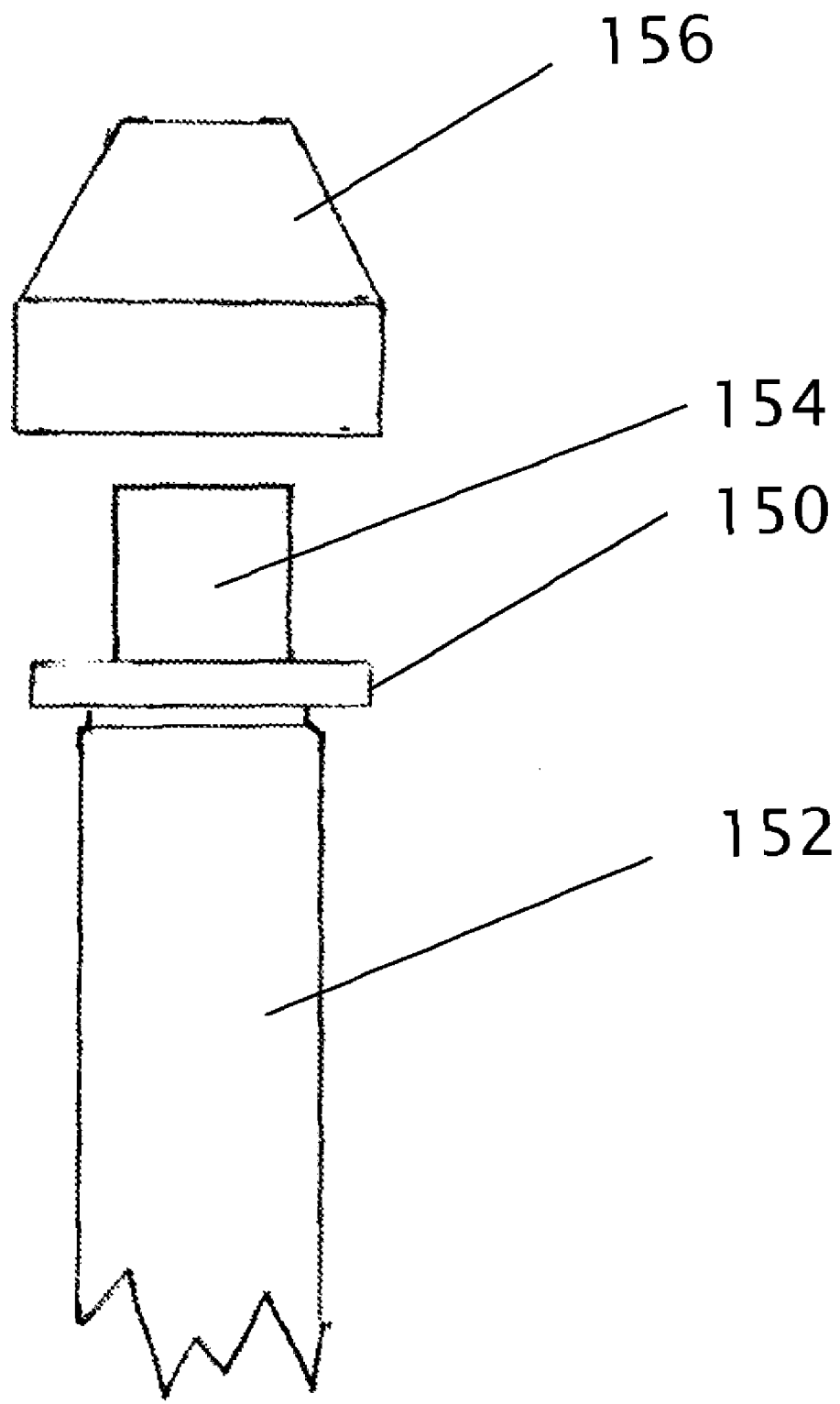
FIG. 11 illustrates one embodiment of my invention wherein the washer is manufactured onto the tire valve stem.

Referring to FIG. 11, there is shown another embodiment of my invention wherein the washer (150) is permanently fixed to the valve stem (152). This can take place during the manufacturing of the valve stem or after market at a tire shop. In this embodiment, the valve stem upper portion (154) may or may not be threaded. In this configuration, no threads are necessary on the top metallic portion of the valve stem and this will save the valve stem manufacturer money. The valve body (156) is placed over the top portion of the valve stem and is magnetically adhered to the washer.

Figure 12:
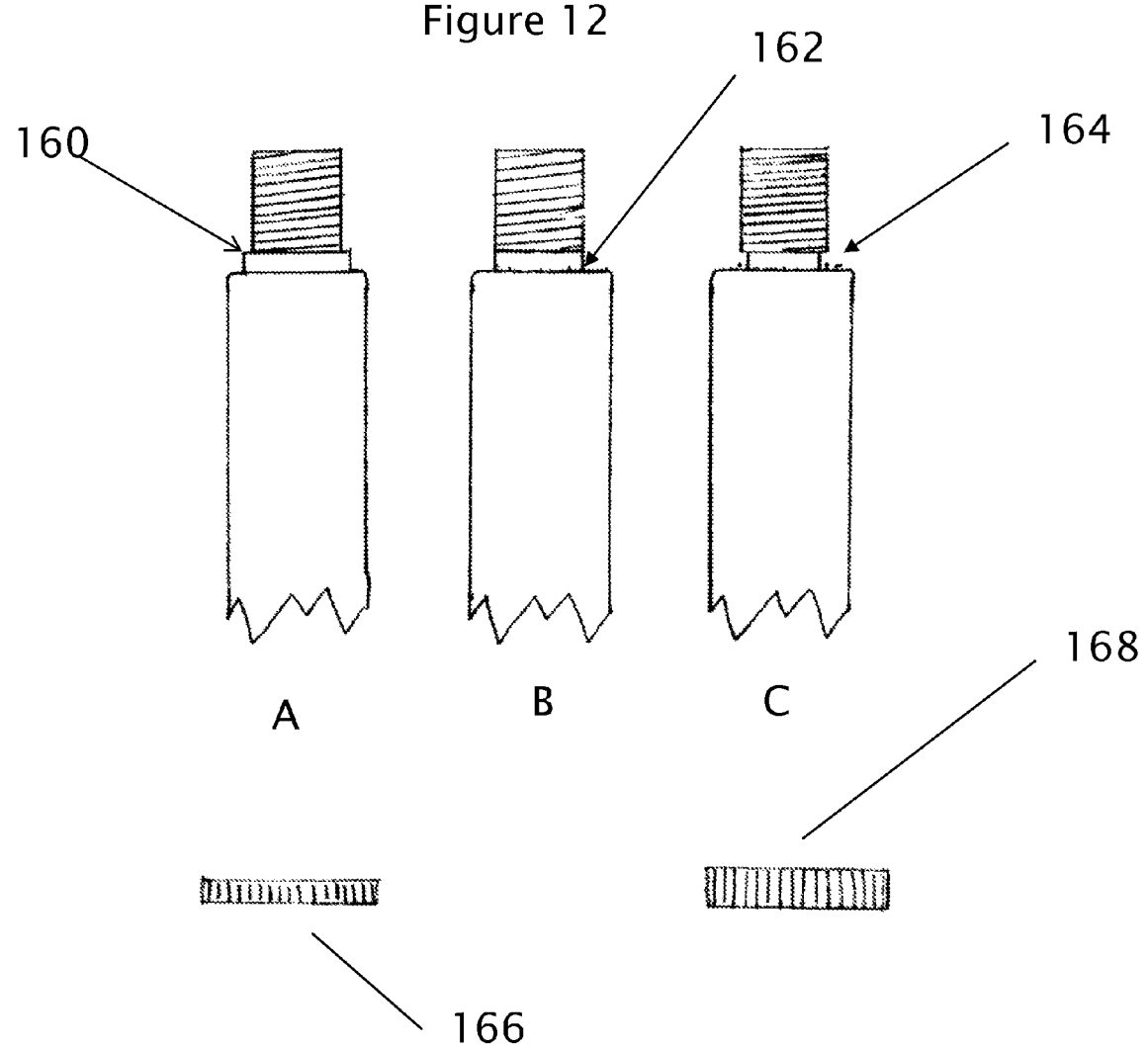
FIG. 12 illustrates the use of washers having various thicknesses in one embodiment of my invention.

Referring to FIG. 12, there are shown three embodiments of valve stems (A, B and C). There is a different thickness of the gap (160, 162, and 164) between the top of the rubber portion of each valve stem and the bottom of the metallic portion of each valve stem. To accommodate this gap, my invention will be supplied with a variety of washer thicknesses (166, 168). In another embodiment of my invention space washers will be used as previously described with reference to FIG. 5B.

Figure 13:
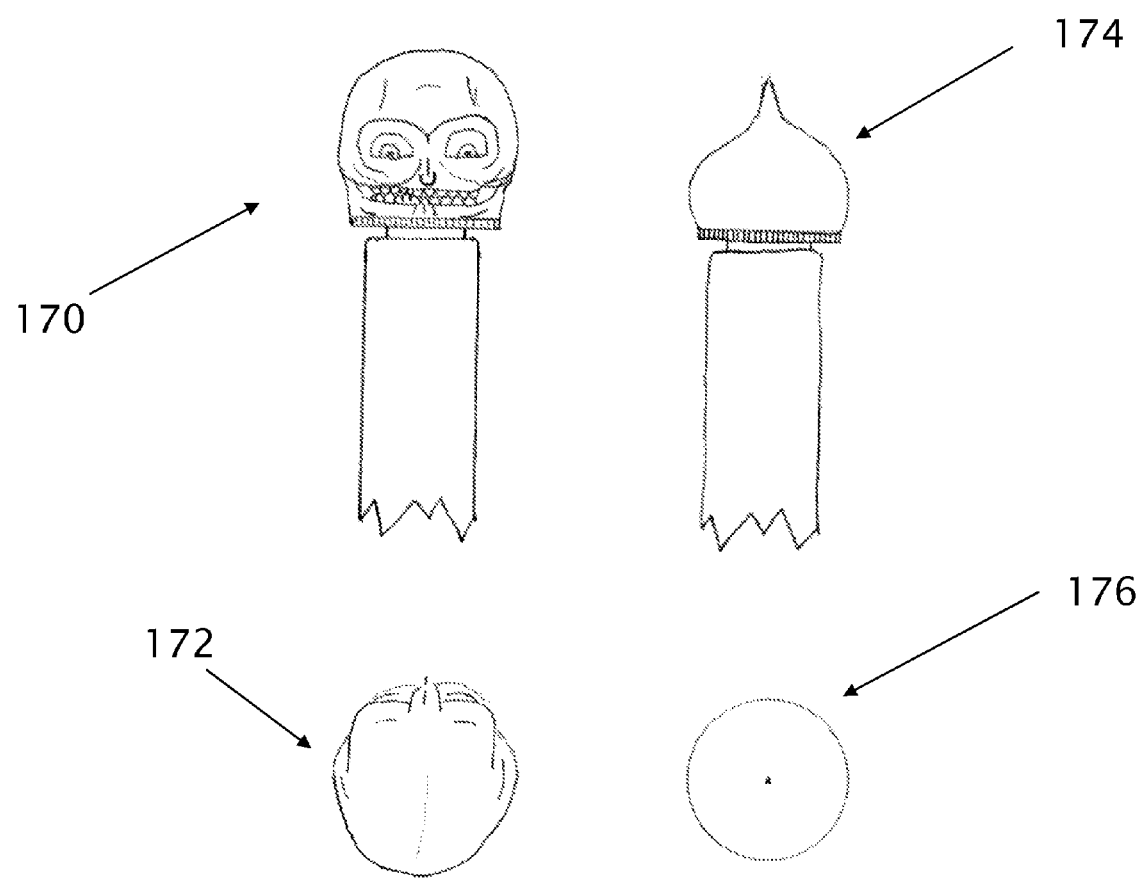
FIG. 13 illustrates ornamented dust cap bodies of embodiments of my invention.

Referring to FIG. 13, there are shown various ornamental aspects of my invention wherein the valve cap body may take the shape of a skull (170 side view, 172 top view) or a dome (174 side view, 176 top view).

Figure 14:
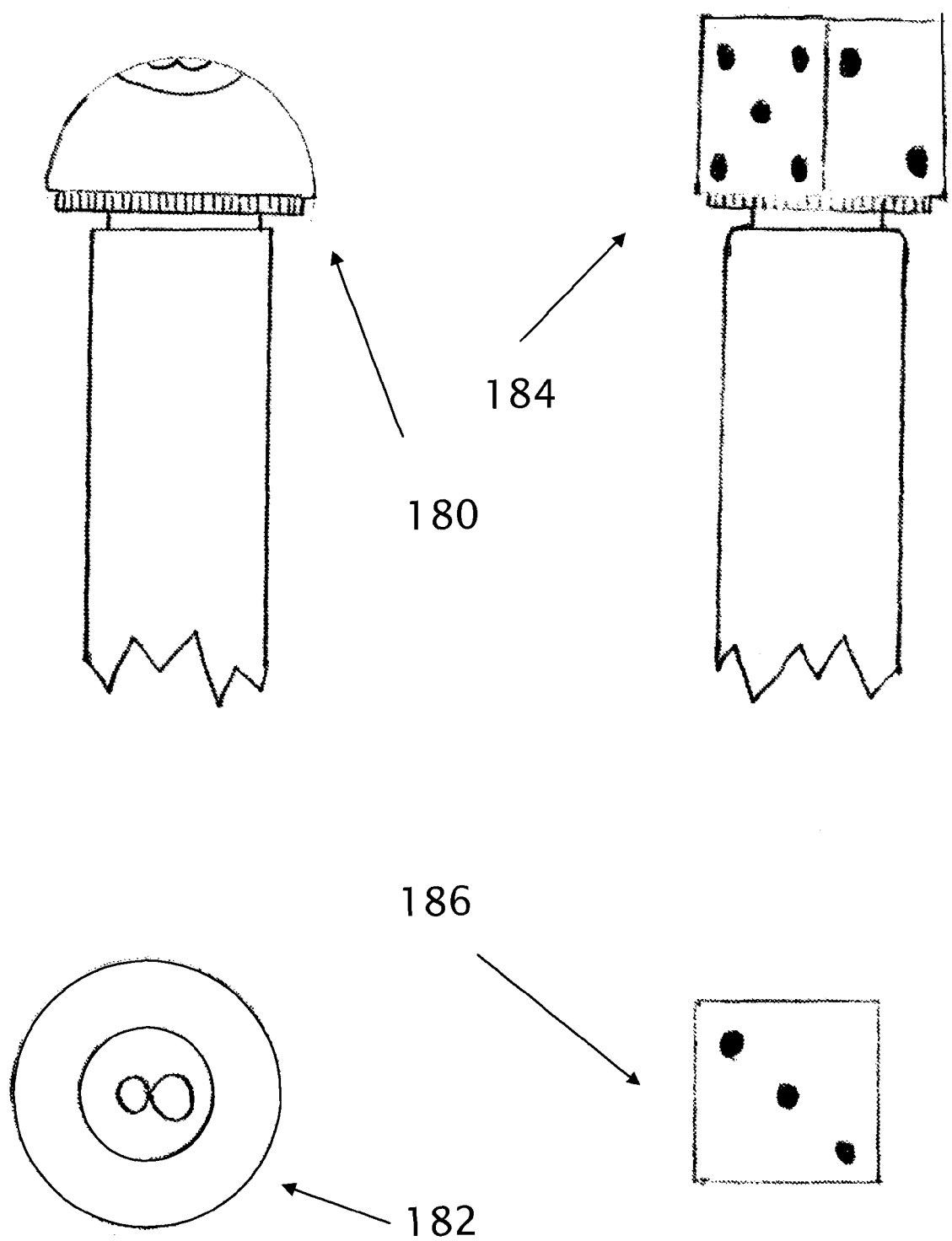
FIG. 14 illustrates additional ornamented dust cap bodies of embodiments of my invention.

Referring to FIG. 14, there are shown more ornamental aspects of my invention wherein the cap body is in the shape of an eight-ball (180 side view, 182 top view) or a die (184 side view, 186 top view). Generally, any design may be used with the invention that does not detract from or diminish its functionality as a dust cap.

Figure 15:
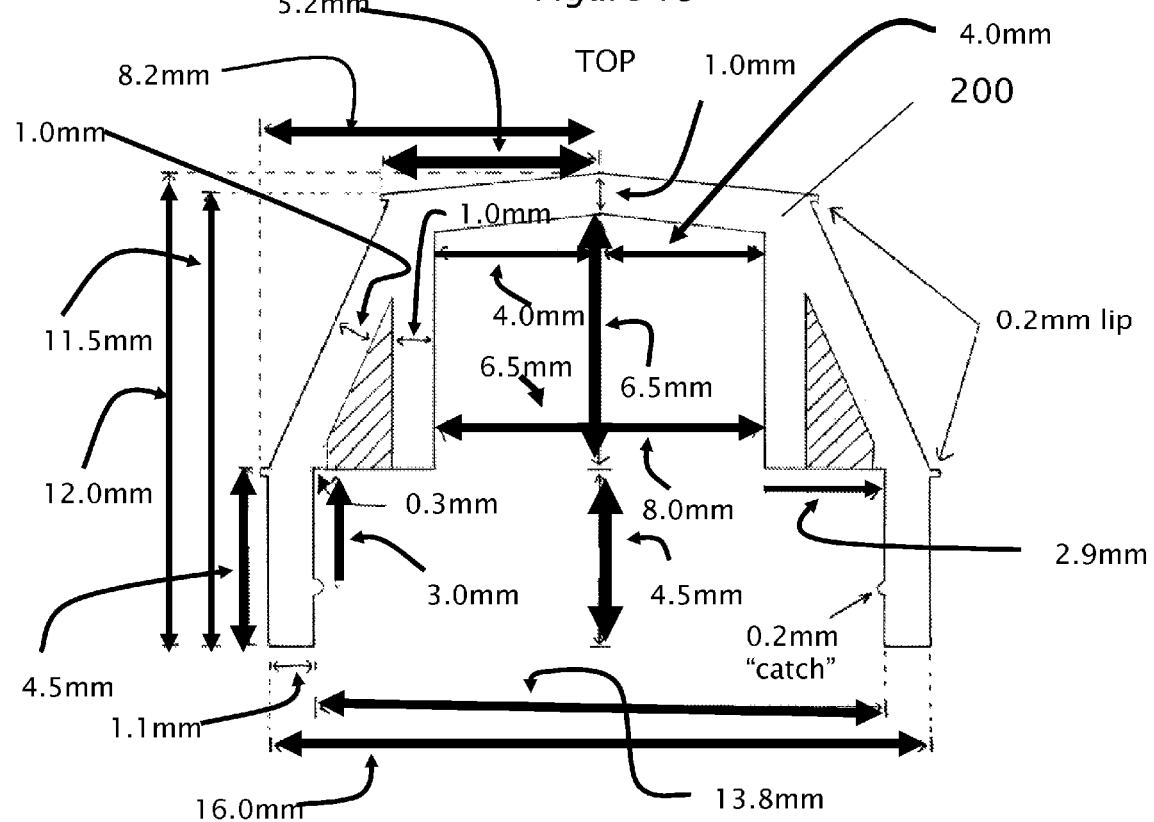
FIG. 15 illustrates dimensions of one preferred embodiment of my invention.

Referring to FIG. 15, there is shown another preferred embodiment of the dust cap body (200) of my invention with detailed dimensions. However, these dimensions can be altered to suit the manufacture of the other embodiments of my invention described herein and to suit other applications as a person skilled in the art might envision.

Kits can be prepared for retail sales and ready installation as after market items for tires. The kits will comprise a suitable number of valve caps and washers to suite various types of tires such as those with and without valve stems having rubber bottom portions. The kits will be conveniently packaged so that the consumer can view and select the desired combination of parts and/or ornamentation of the valve cap.

Although the description above contains much specificity, these should not be construed as limiting the scope of the invention but merely providing illustration of some of the presently preferred embodiments of this invention. Thus the scope of the invention should be determined by the appended claims and their legal equivalents.

What is claimed is:

1. A magnetic valve cap for a pneumatic tire comprising an external valve stem having a threaded top portion, said threaded top portion having a width, a length, a top end and a bottom end; and, a bottom portion having a width and a top end, said magnetic valve cap comprising: a. a valve cap body for covering said external valve stem, said valve cap body comprising an outer surface, a closed top surface, an open bottom surface, an internal volume and inside surface; b. a permanent magnet disposed permanently within the valve cap body, said permanent magnet adapted to removeably adhere the valve cap body axially to; c. a metallic washer disposed below the permanent magnet and adapted for the threaded engagement over the threaded top portion of the valve stem so that said metallic washer has a final position abutting the top end of the valve stem bottom portion.

2. The device of the claim 1 wherein the valve cap body is metallic.

3. The device of claim 1 wherein the valve cap body is non-metallic.

4. The device of claim 1 wherein said internal volume comprises a substantially square top portion having a first height and a first width substantially equal and wherein said first width is sufficient to accept said threaded top portion of the valve stem, a disc-shaped middle portion having a generally rectangular cross-section, a second height and a second width substantially larger than the first width and said second height for housing the permanent magnet and a bottom wafer portion having a third height substantially smaller than the second height and a third width equal to said second width and adapted for receiving the metallic washer.

5. The device of claim 1 wherein the permanent magnet comprises a rare earth magnet.

6. The device of claim 2 wherein the valve cap body is non-ferrous.

7. The device of claim 4 wherein the combined first, second and third heights are sufficient to accept said length of the threaded top portion of the valve stem so that when the valve cap body is placed over the treaded top portion of the valve stem the bottom surface of the valve cap body is positioned slightly below said top end of the threaded washer thereby forming a tight compressive seal around the perimeter of the washer to prevent dirt and moisture from entering the valve stem.

8. The device of claim 7 wherein said bottom wafer portion is shaped like a thin truncated cone having a top surface and a bottom surface and a first and second inwardly inclined sides, wherein the top surface is shorter than the bottom surface and the bottom surface of the bottom wafer portion has the same length as the bottom surface of the middle disc-shaped portion of the void so that a lip is formed around the perimeter of the lower surface of the disc-shaped portion, and wherein said lip is adapted to support the permanent magnet within the valve cap body.

9. The device as claimed in claim 8 wherein the valve cap body is positioned over the valve stem threaded portion until the valve cap body bottom surface compressively engages the top end of the bottom portion of the valve stem thereby providing an environmental seal to prevent dust and moisture from penetrating the valve stem.

10. The device of claim 5 wherein the rare earth magnet is shaped in the form of a ring having an annulus having a diameter permitting passage of the top portion of the valve stem without frictional contact, and a thickness equal to the height of the valve cap body middle portion so it may be fitted entirely within the middle portion.

11. The device of claim 10 wherein the rare earth magnet is inserted into the valve cap body so that said lip acts to support the bottom surface of the rare earth magnet and retain it within the dust cap body middle portion.

12. The device of the claim 11 wherein the rare magnet is adhesively secured within a valve cap body.

13. The device of claim 12 wherein said washer is adapted for threaded engagement with the treaded top portion of the valve stem so that the washer may be threaded down the valve stem until it is in permanent compressive contact with the top surface of the bottom portion of the valve stem.

14. The device of claim 13 wherein upon placement of the valve cap body over the treaded portion of the valve stem, the rare earth magnet comes into contact with the top surface of the washer and adheres magnetically thereto thereby maintaining the valve cap body in a secure, sealed and removeably fixed position.

15. The device of claim 14 wherein upon removal of the valve cap body from the threaded portion of the valve stem, the rare earth magnet will removeable fix the valve cap body to an adjacent metallic surface to prevent loss and permit an operator hands free operation of air service equipment.

16. The device of claim 15 wherein the valve cap body is adapted for the formation of a plurality of ornamental designs by molding means.

* * * * *